United States Patent [19]

Henry

[11] 4,309,694
[45] Jan. 5, 1982

[54] ZERO DISPARITY CODING SYSTEM

[75] Inventor: Paul S. Henry, Holmdel, N.J.

[73] Assignee: Bell Telephone Laboratories, Incorporated, Murray Hill, N.J.

[21] Appl. No.: 134,485

[22] Filed: Mar. 27, 1980

[51] Int. Cl.³ .................... H04L 3/02; H03K 13/24
[52] U.S. Cl. ............................ 340/347 DD; 371/55
[58] Field of Search ........... 375/25, 19; 340/347 DD; 235/310, 311; 371/55, 52; 360/34

[56] References Cited

U.S. PATENT DOCUMENTS

| | | | |
|---|---|---|---|
| 2,996,578 | 8/1961 | Andrews | 375/18 |
| 3,149,323 | 9/1964 | Aaron | 340/347 DD |
| 3,300,774 | 1/1967 | Chatelon | 340/347 DD |
| 3,349,177 | 10/1967 | Cattermole | 375/25 |
| 3,502,810 | 3/1970 | Aaron | 340/347 DD |
| 3,587,086 | 6/1971 | Chatelon | 340/347 DD |
| 3,631,471 | 12/1971 | Griffiths | 340/347 DD |

OTHER PUBLICATIONS

Franklin "IEEE Trans. on Communications" Dec. 1972 pp. 1182-1184.
Lyon "IEEE Transactions on Communications" Dec. 1973 pp. 1438-1441.
Asabe "IEEE Transactions on Communications" pp. 1136-1140.
Greenstein "The Bell System Technical Journal" Jul.-Aug. 1974 vol. 53 No. 6 pp. 1103-1126.
Cattermole "Principles of Pulse Code Modulation" 1969 pp. 362-381 and 248.

Primary Examiner—Charles D. Miller
Attorney, Agent, or Firm—David R. Padnes

[57] ABSTRACT

In a digital transmission system, disparity is defined as the difference between the number of binary digits at each code state. The generation of a block of binary digits having zero disparity possesses many advantages. The present invention discloses coding apparatus (100, 300) for converting a block of binary digits having random disparity into a zero disparity block, and vice versa. The coder accomplishes this translation by determining (103) the disparity of the random disparity block and then selecting (103, 104, 106, 107, 110, 111) a bit position which divides the block into two digit segments each having half this disparity. Inversion (115) of either digit segment generates a zero disparity block. For decoding, data representing the bit position selected is transmitted along with the zero disparity block. The binary digits previously inverted by the coder are then reinverted. This coding/decoding technique is adaptable to any block size having an even number of binary digits.

12 Claims, 3 Drawing Figures

ZERO DISPARITY CODING SYSTEM

TECHNICAL FIELD

This invention is directed to digital transmission systems and, more particularly, to a system which generates a block of binary digits having zero disparity.

BACKGROUND OF THE INVENTION

Disparity is defined as the difference between the number of binary digits at each code state. Zero disparity coding, i.e., the generation of an equal number of binary digits at each code state, biases the center-line of the bit stream midway between code states. This biasing of the center-line minimizes errors in code state detection due to center-line drift. Such coding also guarantees bit transitions for the extraction of timing information from the digital bit stream. In wire systems having complementary binary codes, e.g., ±1, zero disparity coding can be used to assure the absence of signal energy at dc. This absence of a dc component permits the transmission of dc power along with the digital signal on a common wire path. The advantages of zero disparity coding also apply to radio systems. In phase-modulated radio systems, for example, zero disparity coding allows the use of a lower-powered carrier signal.

Prior art techniques for zero disparity coding have centered around the conversion of a binary code into a ternary one. For example, in U.S. Pat. No. 2,996,578 issued Aug. 15, 1961, to F. T. Andrews, Jr., each binary "1" is transmitted as a pulse opposite in polarity to the preceding "1" pulse. A variation of this technique, disclosed in U.S. Pat. No. 3,149,323 to M. R. Aaron et al, issued Sept. 15, 1964, inverts the polarity of alternate groups of n consecutive "1" pulses, where n is an integer greater than one.

More recent techniques for zero disparity coding have relied on either a direct look-up in a code translation table, or execution of a conversion algorithm. The use of a code translation table requires an extremely large memory to handle blocks having more than a few tens of binary digits. The disclosed conversion algorithms, on the other hand, involve considerable computation and are, therefore, not easily implementable. See, for example an article entitled, "Two-Level Block Encoding for Digital Transmission", IEEE Trans. Comm., COM-21, December, 1973, pages 1438-1441. Accordingly, an easily implementable zero disparity encoding technique capable of handling large size blocks of binary digits is desirable.

SUMMARY OF THE INVENTION

In accordance with the present invention, a block of binary digits having zero disparity is generated from a data block of binary digits having random disparity. This translation is accomplished by selecting a bit position within the random disparity block which defines two digit segments, each having one-half the total block disparity. A zero disparity block is then generated by the inversion of all bits within one segment. Error free decoding of the zero disparity block is provided by the transmission of data representing the bit position which defines the two digit segments, along with the zero disparity block.

A feature of the present invention is its applicability to any even-numbered sized block.

A further feature of the present invention is that the bit position can also be coded and transmitted in zero disparity format.

DETAILED DESCRIPTION

Figures 1, 2:
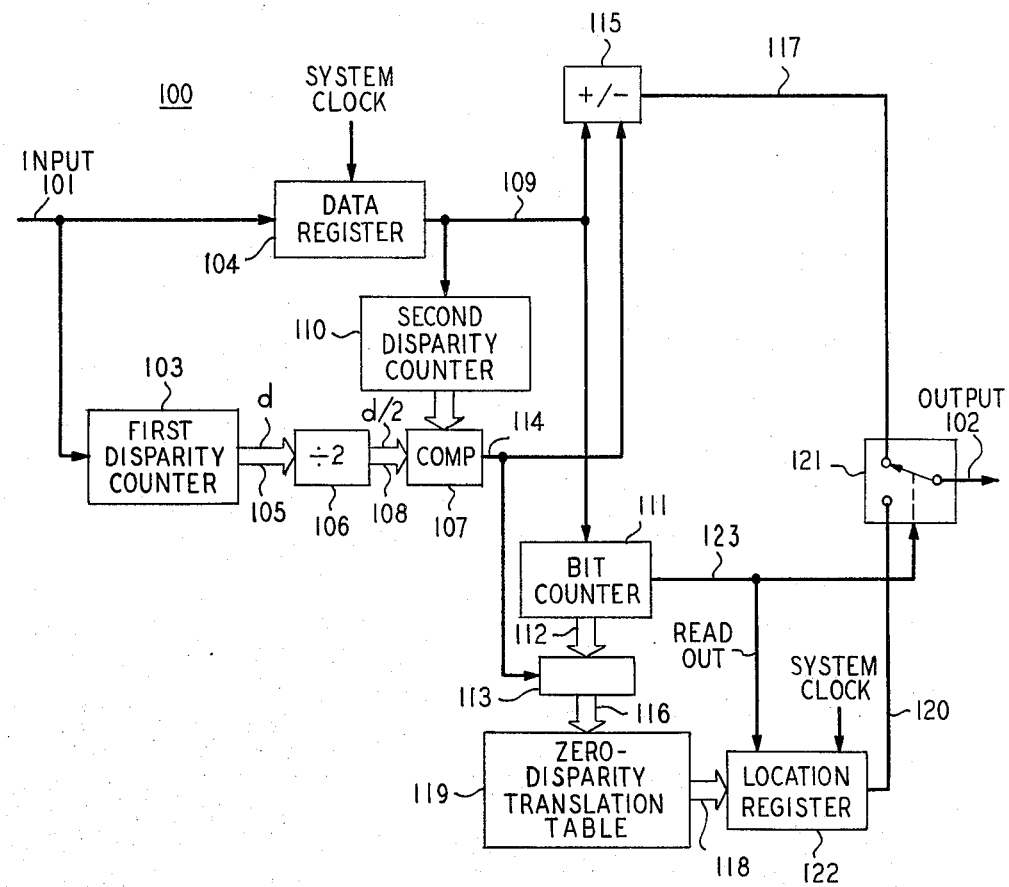
FIG. 1 shows a schematic block diagram of encoding circuitry pursuant to the present invention.
FIG. 2 shows an illustrative random disparity block along with the zero disparity block which results from application of the present invention.

Referring to FIG. 1, coder 100 converts a data block of binary digits having random disparity on input lead 101 into a zero disparity block. Output 102 couples this zero disparity block to a transmission facility.

FIG. 2 illustrates a typical random disparity data block 200 of eight binary digits and the zero disparity block 203 resulting therefrom. This conversion is based on the observation that in any block, having an even number of binary digits, it is always possible to find a location which defines two digit segments having equal disparity. A zero disparity block can then be created by the inversion of all the digits within either segment.

The validity of this assertion will be illustrated in reference to FIG. 2. The disparity of random disparity block 200 is two. This number is determined by subtracting the number of "0's" from the number of "1's". For this block having a disparity of two, it is possible to define two digit segments having one-half the total disparity. Bit position four defines two segments 201, 202 each having a disparity of one. Once this bit position is determined, a zero disparity block is generated by inverting either of the segments. In FIG. 2, the five binary digits in segment 201 can be inverted from a 0,1,0,1,1 to a 1,0,1,0,0, respectively, to produce zero disparity block 203. Alternatively, zero disparity block 204 can be generated by inverting the three binary digits in segment 202 from a 0,1,1 to a 1,0,0, respectively. For decoding, data representing bit position four is sent to the receiver along with zero disparity block 203 or 204. The decoder, of course, must reinvert the same binary digits that were previously inverted by the coder.

Transmission of the data representing the bit position is preferably in zero disparity format. One method of coding the bit position into data having zero disparity format is by means of a translation table. The number of bits required for coding the bit location increases with block size. If the zero disparity data representation of the bit position is L bits, then the maximum number of bits per block, B, is governed by the following:

$$B = [L!(L/2!)^2]. \tag{1}$$

The bit position is dependent on the content of the block and, therefore may be disposed in any one of B positions. Consequently, the translation table capacity, in bits, is equal to BL. It should be noted that this capacity is substantially less than the $2^B B$ capacity required for the prior art use of a coded translation table for conversion of an entire data block of B bits into zero disparity format.

Returning to FIG. 1, the binary digits on input 101 are loaded into data register 104, which has a capacity equal to the number of binary digits per data block. Data register 104 is a serial shift register wherein the write-in of binary digits is clocked by the system clock. The read-out cycle, also controlled by the system clock, begins on the first clock pulse after the register is filled.

First disparity counter 103 is also coupled to input 101 to determine the disparity of the entire data block. This disparity, designated as d, is then divided in half by arithmetic unit 106 and coupled to comparator 107. Bus 105 interconnects first disparity counter 103 to arithmetic unit 106, while bus 108 couples comparator 107 to arithmetic unit 106. Since the data block size is always even, d is also even since it is a difference between two even or two odd numbers. This limitation on block size assures that d/2 is an integer. Moreover, as d is even, division by two in binary operation simply requires dropping the low order zero in d.

Following the determination of d/2, the binary digits in register 104 are read-out serially onto lead 109. Second disparity counter 110 and bit counter 111, tied to lead 109, keep a running total of the disparity and number of binary digits read-out, respectively. Second disparity counter 110 and first disparity counter 103 can be up/down counters that count in opposite directions for each code state. Bit counter 111, on the other hand, counts in only one direction and has a range equal to the number of binary digits per data block. Bus 112 couples each count of bit counter 111 into latch 113. The contents of latch 113 represents the number of binary digits read-out from data register 104. Preferably, bit counter 111 is a binary counter which generates a conventional binary series having unconstrained disparity. For purposes of clarity, the discussion to follow will assume this preferable embodiment.

When the value determined by second disparity counter 110 reaches d/2, comparator 107 generates a signal on lead 114 which activates inverter 115. Once activated, inverter 115 inverts all of the remaining binary digits in the data block. The binary digits passing through inverter 115 prior to the signal on lead 114 are not inverted. Accordingly, the bit stream appearing on lead 117 has zero disparity. This bit stream is coupled through multiplex 121 to output 102. Multiplexer 121 is symbolically illustrated as a switch which has the capability of coupling either lead 117 or lead 120 to output 102. For the above-described operation multiplexer 121 couples lead 117 to output 102.

The signal on lead 114 also strobes latch 113 to couple the binary number stored therein onto bus 116. This binary number represents the bit position which defines two block segments having a disparity of d/2. Preferably, this binary number is also coded into zero disparity format. Zero disparity translation table 119 provides this coding. Table 119 stores a preselected series of binary digits having zero disparity for each possible bit position. Upon entry of a binary number on bus 116, a particular series of binary digits having zero disparity is supplied on bus 118 to location register 122.

When bit counter 111 reaches its maximum count, a signal is generated on lead 123 to activate the read-out of the contents of register 122 on the next system clock pulse. The read-out of register 122 onto lead 120 is then commenced at the system clock rate. The signal on lead 123 also controls multiplexer 121 so as to couple the contents on lead 120 to output 102.

Decoding of the zero disparity block is essentially the inverse of encoding. As will be described, the bit position, in zero disparity format, is first converted into the binary number strobed from latch 113. The binary digits in the zero disparity block appearing after this location are then inverted to regenerate the original random disparity data block.

Figure 3:
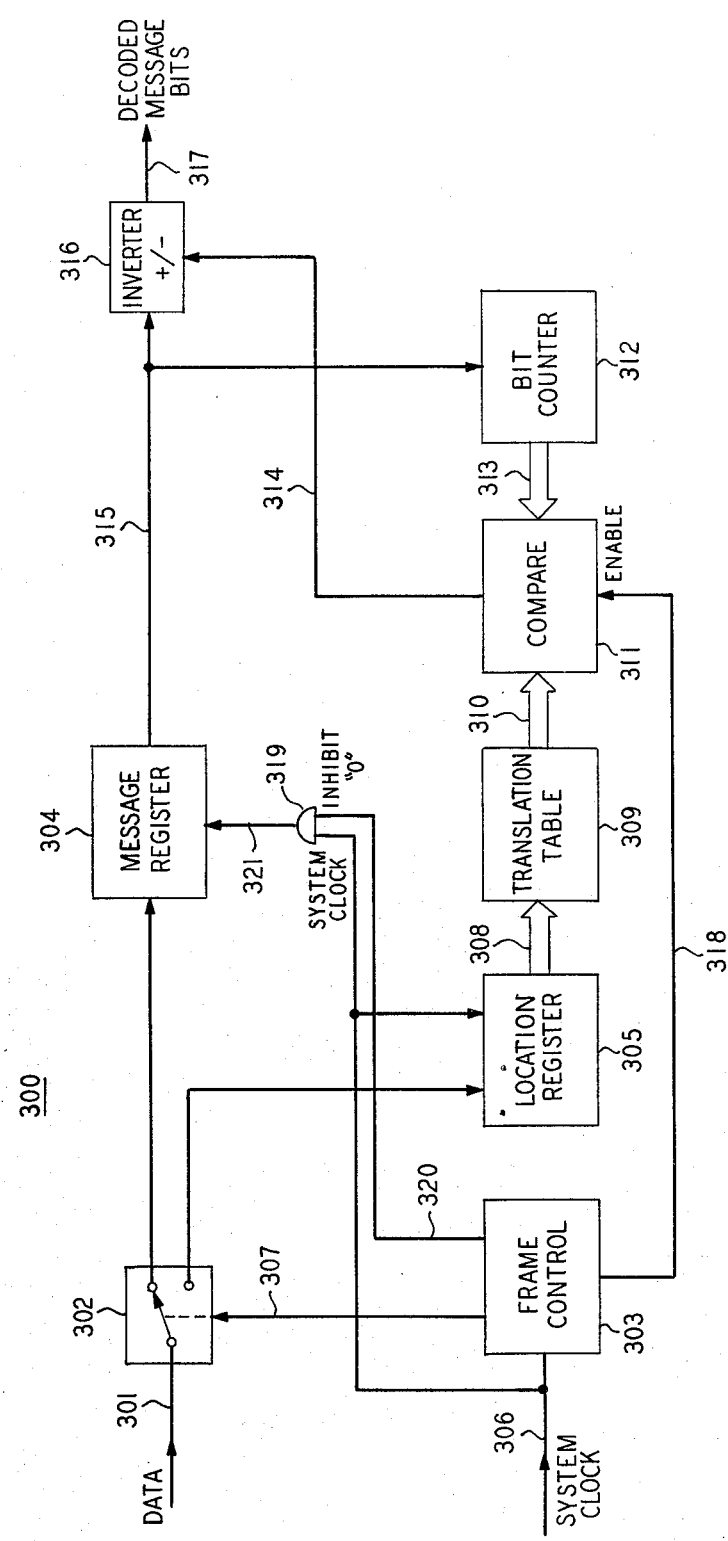
FIG. 3 shows a schematic block diagram of decoding circuitry pursuant to the present invention.

Refer now to FIG. 3. The incoming zero disparity block of binary digits is applied to decoder 300 on lead 301. For purposes of simplicity, it will be assumed that these binary digits have been fed through an appropriate elastic store (not illustrated) so as to be synchronous with the system clock in the coder and decoder. Frame control unit 303, clocked by the system clock via lead 306, steers the binary digits on lead 301 to either message register 304 or location register 305. This steering is accomplished by counting the number of binary digits on lead 301. Once this count equals the number of binary digits per zero disparity block, demultiplexer 302 uncouples lead 301 from message register 304 and, instead, couples lead 301 to location register 305. For illustrative purposes, demultiplexer 302 is represented in FIG. 2 as a switch. The control of demultiplexer 302, at the appropriate time, is provided by frame control unit 303 via lead 307.

Message register 304 and location register 305 are shift registers having maximum capacities equal to the number of binary digits per zero disparity block and the number of binary digits in the series representing bit position, respectively. The write-in operation of both registers is serial and is controlled by the system clock. The read-out operation of message register 304 is also serial and is commenced at the system clock rate on the first system clock pulse after filling. The contents of location register 305, on the other hand, are read-out in parallel and conducted through bus 308 to translation table 309. This parallel read-out is immediately performed after location register 305 has filled and is not controlled by the system clock.

Translation table 309 accepts the zero disparity series representing the bit position and immediately converts the same to the original binary number strobed from latch 113 into zero disparity table 119. This number is then supplied through bus 310 to comparator 311.

To prevent errors in decoding, frame control unit 303 inhibits the read-out of binary digits from message register 304 until after location register 305 has filled. Without this delay, it would be possible for binary digits that were inverted in the coder to pass through the decoder without reinversion. Inhibiting the read-out from message register 304 is accomplished by supplying a logical "0" on input 320 of AND gate 319. The other input of AND gate 319 is supplied with system clock pulses on lead 306. The logic "0" on input 320 holds output 321, which clocks the write and read operations of register 304, at "0". Frame control unit 303 generates a "0" on input 320 after counting the number of binary digits per zero disparity block. This "0" remains until the number of binary digits representing the bit position is counted. At that time, a logic "1" is supplied on lead 320 to enable the read out from message register 304.

Simultaneous with enabling of the read-out from message register 304, frame control unit 303 enables comparator 311 via lead 318. Comparator 311, once enabled, stores the information on bus 310. Bit counter 312, coupled to output 315 of message register 304, counts the number of binary digits read-out. This count is supplied through bus 313 to comparator 311. Comparator 311 comprises the number supplied over bus 313 with the binary number representing the bit position on bus 310. When the two comparator inputs are equal, comparator 311 activates inverter 316 by a signal on lead 314. Once activated, inverter 316 inverts all the remaining binary digits read out from message register 304. The binary digits passing through inverter 316 prior to the signal on 314 are not inverted. As a result, the binary digits on decoder output 317 are identical to those originally supplied to coder input 101.

In the above-described coder and decoder, the inversion of binary digits is begun after the disparity of the binary digits read-out from data register 104 and message register 304, respectively, equals d/2. It should, of course, be understood that the inversion operation can be reversed. Inverters 115, 315, for example, can be activated to invert all binary digits read-out from register 104 and 304 until the disparity of binary digits read-out equals d/2 and then be deactivated. This alternative merely requires the inversion of the control signal applied to both inverters 115 and 315.

While the above-description relates to the coding/decoding of any even sized block of binary digits, it should be obvious to those skilled in the art that the principles illustrated are equally applicable to successive blocks of binary digits using well known control circuit techniques.

As used herein the term "data block" should be understood to include PCM encoded signals such as voice, video, facsimile and so on, as well as the data output of a typical data machine.

I claim:

1. Apparatus (100) for converting a first block (200) of n binary digits having random disparity to a second block (203, 204) having zero disparity, where n is an even number, characterized by
   means (103) for determining the disparity of said first block;
   means (103, 104, 106, 107, 110, 111) for selecting a bit position within said first block which defines two digit segments each having half the disparity of said first block; and
   means (115) for inverting all of the digits within one of said segments.

2. The apparatus of claim 1 wherein said bit position is represented by a series of binary digits.

3. The apparatus of claim 2 further including translation means (119) for converting said series of binary digits into zero disparity format.

4. The apparatus of claim 3 further including means (111, 121, 122) for multiplexing said zero disparity block and the converted series of binary digits.

5. Decoder apparatus (300) for generating a block (200) of n binary digits having random disparity from a block (203) of n binary digits having zero disparity, where n is an even number, and data representing a bit position within said zero disparity block which defines two digit segments (201, 202) each having half the disparity of said random disparity block, characterized by
   means (312) for counting said binary digits within said zero disparity block and generating a control signal when the bit position is counted; and
   means (316) responsive to said control signal for inverting all of the digits within one of said segments.

6. The apparatus of claim 5 further including means (303) for demultiplexing a serial bitstream comprising said zero disparity block and said bit position data.

7. The apparatus of claim 6 wherein said bit position data is a series of binary digits having zero disparity.

8. The apparatus of claim 7 further including translation means (319) for converting said bit position data from a series of binary digits having zero disparity into a conventional series of binary digits having unconstrained disparity.

9. A digital communications system comprising a coder (100) and decoder (300) wherein said coder converts a first block (200) of n binary digits having random disparity to a second block (203, 204) of n binary digits having zero disparity, where n is an even number, and said decoder converts said second block to said first block, said coder being characterized by
   means (103) for determining the disparity of said first block;
   means (103, 104, 106, 107, 110, 111) for selecting a bit position within said first block which defines two digit segments (201, 202) each having half the disparity of said first block and generating a data representation therefrom;
   means (115) for inverting all of the digits within a preselected one of said segments; and
   means (111, 121, 122) for multiplexing said zero disparity block and said data representation into a serial bit stream.

10. The digital communications system of claim 9 wherein said decoder is characterized by
    means (303) for demultiplexing said data representation from said serial bit stream;
    means (311, 312) for counting said binary digits within said zero disparity block and generating a control signal when said bit position is counted; and
    means (316) responsive to said control signal for inverting all of the digits within said preselected one of said segments.

11. The digital communications system of claim 10 wherein said data representation of said bit position is a series of binary digits having unconstrained disparity and said counting means is a binary counter.

12. The digital communications system of claim 11 further including translation table means (119) in said coder for converting said data representation from said series of binary digits having unconstrained disparity to a series having zero disparity format and reciprocal translation table means (309) in the decoder for converting said zero disparity series to said series having unconstrained disparity.

* * * * *